(12) United States Patent
Castillo

(10) Patent No.: US 11,461,072 B1
(45) Date of Patent: Oct. 4, 2022

(54) MOVIE THEATER AUDIO DISTRIBUTION SYSTEM AND METHOD OF USE

(71) Applicant: Stacey Castillo, Houston, TX (US)

(72) Inventor: Stacey Castillo, Houston, TX (US)

(*) Notice: Subject to any disclaimer, the term of this patent is extended or adjusted under 35 U.S.C. 154(b) by 0 days.

(21) Appl. No.: 17/016,880

(22) Filed: Sep. 10, 2020

(51) Int. Cl.
*G06F 3/16* (2006.01)
*G06F 3/14* (2006.01)
*H04R 1/10* (2006.01)

(52) U.S. Cl.
CPC ............. *G06F 3/165* (2013.01); *G06F 3/14* (2013.01); *H04R 1/1041* (2013.01); *H04R 2420/07* (2013.01)

(58) Field of Classification Search
None
See application file for complete search history.

(56) References Cited

U.S. PATENT DOCUMENTS

| | | | |
|---|---|---|---|
| 2014/0022454 A1* | 1/2014 | Oh | H04N 21/8106 348/515 |
| 2015/0026574 A1* | 1/2015 | Dow | G06F 9/451 715/719 |
| 2016/0232878 A1* | 8/2016 | Chen | G06F 3/165 |

* cited by examiner

*Primary Examiner* — Mark Fischer
(74) *Attorney, Agent, or Firm* — Leavitt Eldredge Law Firm

(57) ABSTRACT

A movie theater audio distribution system includes a visual display associated with a theater, the visual display having a transmitter; a server to control the visual display; a computer having an audio programing platform to command the server to control the visual display; a headphone device having a transceiver to communicate wirelessly with the server, the headphone device having a control system to receive commands from the server; the audio programming platform provides a way to command the server to transmit an audio to the headphone device correlated to the visual display; and the transmitter is to wirelessly communicate with the transceiver thereby activating the audio associated with the visual display to play through the headphone device when the headphone device is in close proximity to the visual display.

9 Claims, 4 Drawing Sheets

MOVIE THEATER AUDIO DISTRIBUTION SYSTEM AND METHOD OF USE

BACKGROUND

1. Field of the Invention

The present invention relates generally to movie theater systems, and more specifically, to a movie theater audio distribution system for customizing the audio heard by various patrons within the same theater.

2. Description of Related Art

Theater systems are well known in the art and are effective means for people to enjoy movies. For example, FIG. 1 depicts a conventional theater system 101 having a plurality of seats 103 positioned around a visual display 105, the visual display 105 controlled by a control system 107 having one or more of a computer 109, a database 111, and a server 113. During use, an image is projected from control system 107 to display 105, wherein an audio 115a, 115b is projected to the audience and associated with visual display 105.

One of the problems commonly associated with system 101 is foreign language translation of movies. For example, non-English speaking patrons cannot enjoy theater system 101, as the audio 115a is generally exclusively an English version of the movie.

Accordingly, although great strides have been made in the area of theater systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
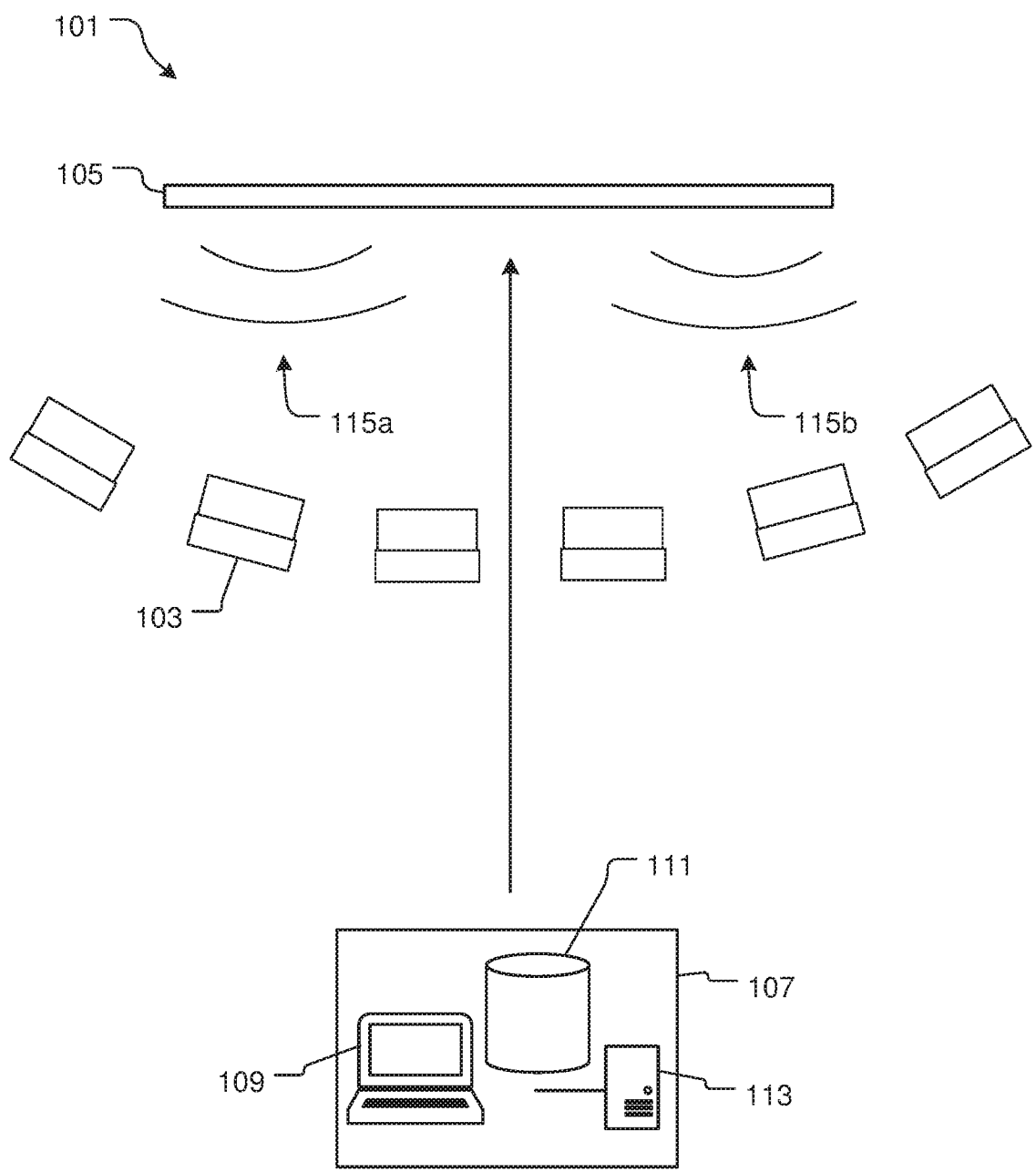
FIG. 1 is a simplified schematic of a common theater system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional theater systems. Specifically, the present invention provides a means for a patron to have customized audio associated with a movie. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
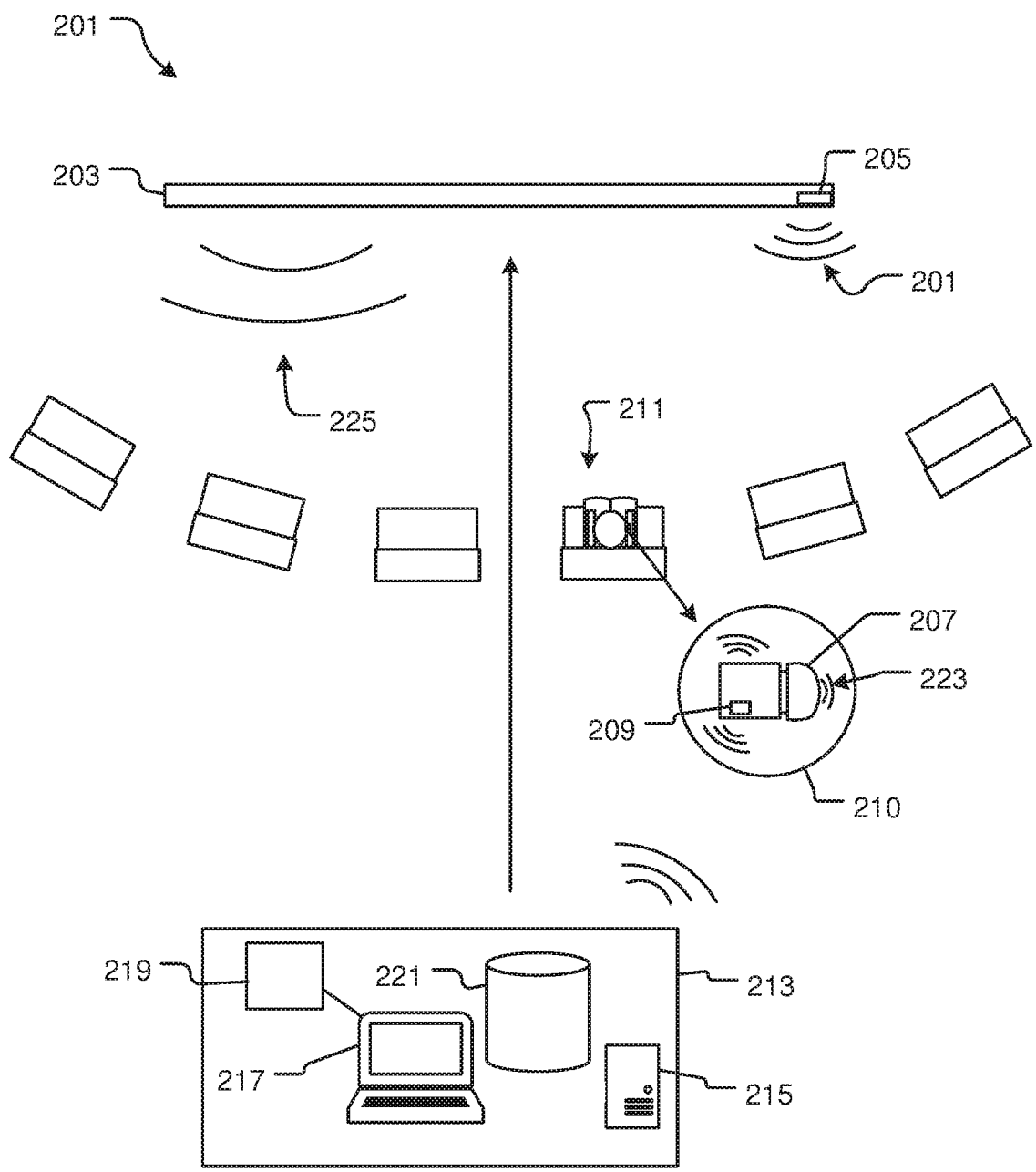
FIG. 2 is a simplified schematic of a movie theater audio distribution system in accordance with a preferred embodiment of the present application.

Referring now to the drawings wherein like reference characters identify corresponding or similar elements throughout the several views, FIG. 2 depicts a simplified schematic of a movie theater audio distribution system 201 in accordance with a preferred embodiment of the present application. It will be appreciated that system 201 overcomes one or more of the above-listed problems commonly associated with conventional theater systems.

In the contemplated embodiment, system 201 includes a visual display 203 having a transmitter 205 configured to wirelessly communicate with a headphone device 207 via a transceiver 209. It should be appreciated that although visual display 203 is shown as a movie theater screen, the display could be an advertisement banner or poster throughout the movie theater. Headphone device 207 (shown in more detail in circle 210) is worn by a patron 211 attending a movie theater.

System 201 further includes a control system 213 having at least a server 215 and a computing device 217 with an audio programming platform 219. Control system 213 can further include one or more databases 221. In the preferred embodiment, control system 213 is configured to transmit audio 223 to headphone device 207 associated with display 203. It should be appreciated that audio 223 is independent of audio 225 typically generated to correlated with display 203, thereby allowing for patron 211 to receive customized audio, such as a foreign language translation associated with a movie. It should be appreciated that activation of device 207 is based upon wireless interaction between transmitter 205 and transceiver 209 and commands received by control system 213, thereby ensuring patron 211 is provided with the correct audio. It should be appreciated that the audio 223 streamed to device 207 can be a foreign translation, an advertisement, a theater amenity infomercial, or any other information as programmed via computer 217.

It should be appreciated that one of the unique features believed characteristic of the present application is the limited activation of device 207 based on proximity to a visual display. It should be understood that this feature helps prevent patrons from attending multiple movies without permission.

Figure 3:
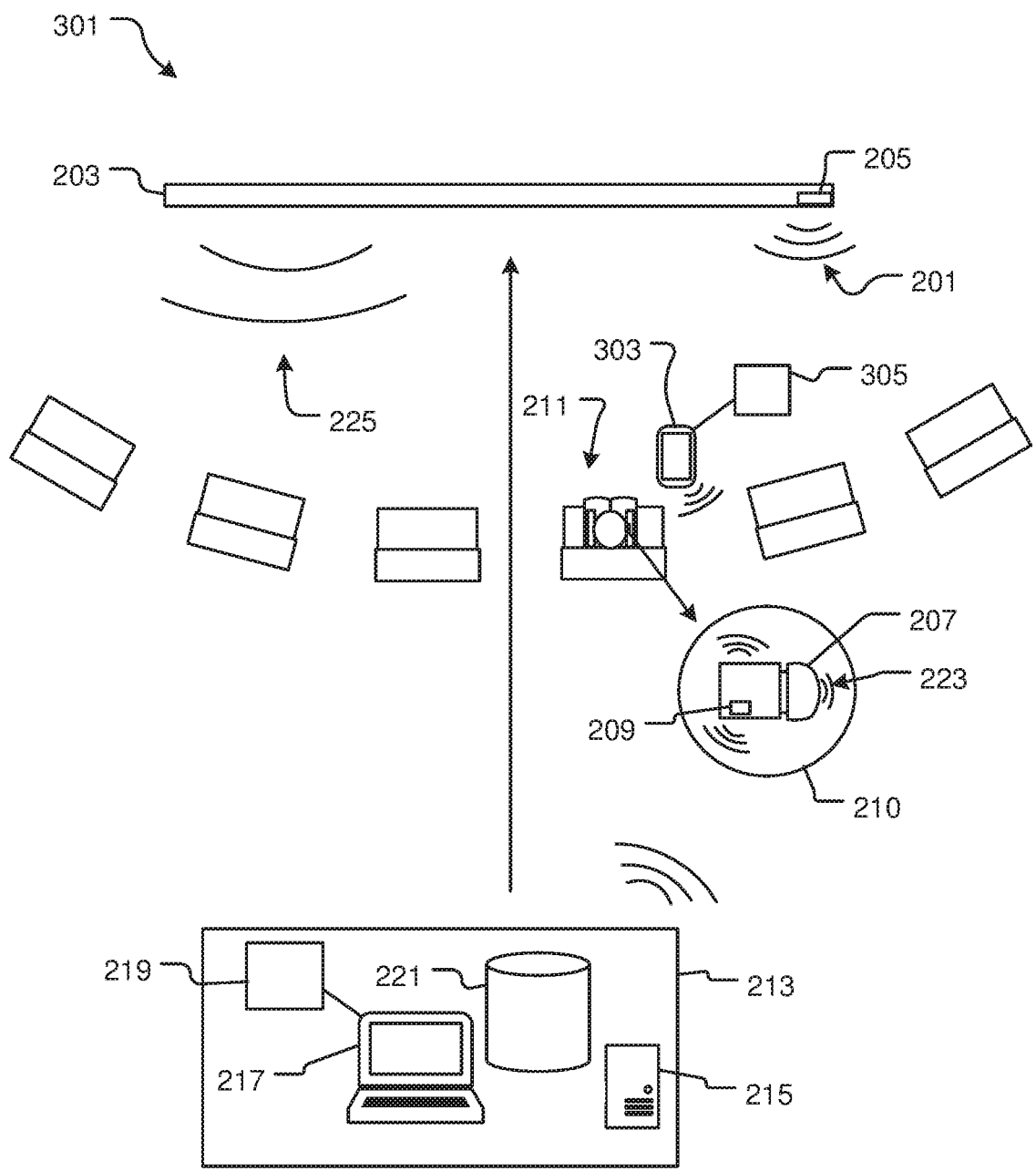
FIG. 3 is a simplified schematic of a movie theater audio distribution system in accordance with an alternative embodiment of the present application.

In FIG. 3, a simplified schematic of an alternative embodiment of a movie theater audio distribution system 301 is shown. It should be appreciated that system 301 includes all of the features discussed above associated with system 201, and further includes a mobile device 303 with a mobile application 305 configured to control features of headphone 207 such as volume.

Figure 4:
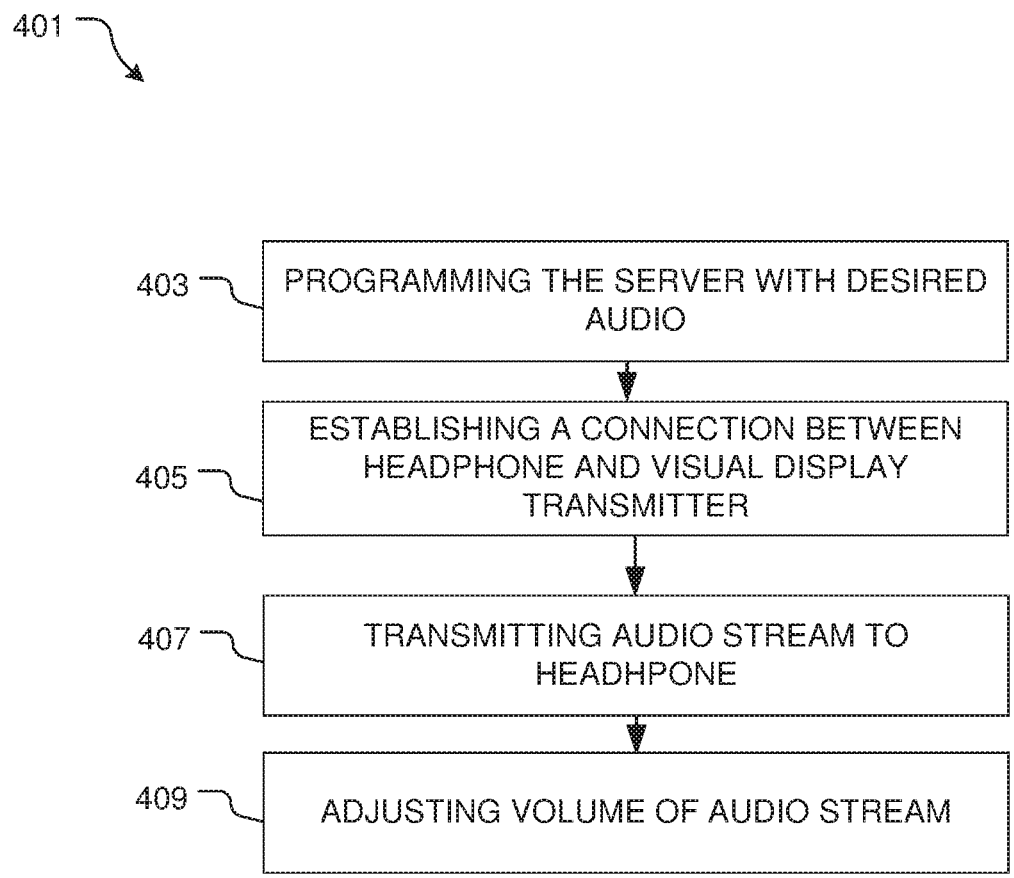
FIG. 4 is a flowchart of the method of FIG. 2 or FIG. 3.

In FIG. 4, a flowchart depicts the method of systems 201 and 301. The computer is used to program the server with the appropriate audio to transmit to the headphone device, as shown with box 403. A connection must be established between the headphone and the visual display, thereby ensuring that the patron is in the correct theater or at the correct location, as shown with box 405. The audio is streamed to the headphone, as shown with box 407. If system 301 is used, the patron can adjust the volume of the audio stream via the mobile device, as shown with box 409.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A movie theater audio distribution system, comprising:
a visual display associated with a theater, the visual display having:
a transmitter;
a server configured to control the visual display;
a computer having:
an audio programing platform configured to command the server to control the visual display;
a headphone device having a transceiver configured to communicate wirelessly with the server, the headphone device having:
a control system configured to receive commands from the server;
wherein the audio programming platform provides a means to command the server to transmit an audio to the headphone device correlated to the visual display; and
wherein the transmitter configured to wirelessly communicate with the transceiver thereby activating the audio associated with the visual display to play through the headphone device when the headphone device is in close proximity to the visual display.

2. The system of claim 1, wherein the visual display is a movie theater screen.

3. The system of claim 1, wherein the visual display is an advertisement.

4. The system of claim 1, wherein the audio programming platform provides a means to command the server to transmit theater amenity information to the headphone device.

5. The system of claim 1, wherein the audio is an official foreign translation associated with a movie of the visual display.

6. The system of claim 1, further comprising:
a mobile device configured to wirelessly communicate with the transceiver; and
a mobile application configured to command the control system from the mobile device.

7. A method of streaming audio to a theater patron, the method comprising:
providing the system of claim 1;
programming the server with a desired audio stream; and
transmitting the audio stream to the headphone device;
wherein the audio stream correlates to the visual display; and
wherein playing of the audio stream through the headphone device is activated based upon proximity of the headphone device to the transmitter of the visual display.

8. The method of claim 7, wherein the audio stream is a foreign language translation of a movie playing on the visual display.

9. The method of claim 7, wherein the audio stream is an advertisement.

* * * * *